April 30, 1968 B. L. FLEISHER ET AL 3,381,120
TRAVEL CASE WITH DETACHABLE ILLUMINATED COSMETIC MIRROR
Filed May 9, 1966 5 Sheets-Sheet 1

INVENTORS
BERNARD L. FLEISHER
SEYMOUR KATZ
HENRY P. STERN
RICHARD V. WEISS

Buehler & Crantz
ATTORNEYS

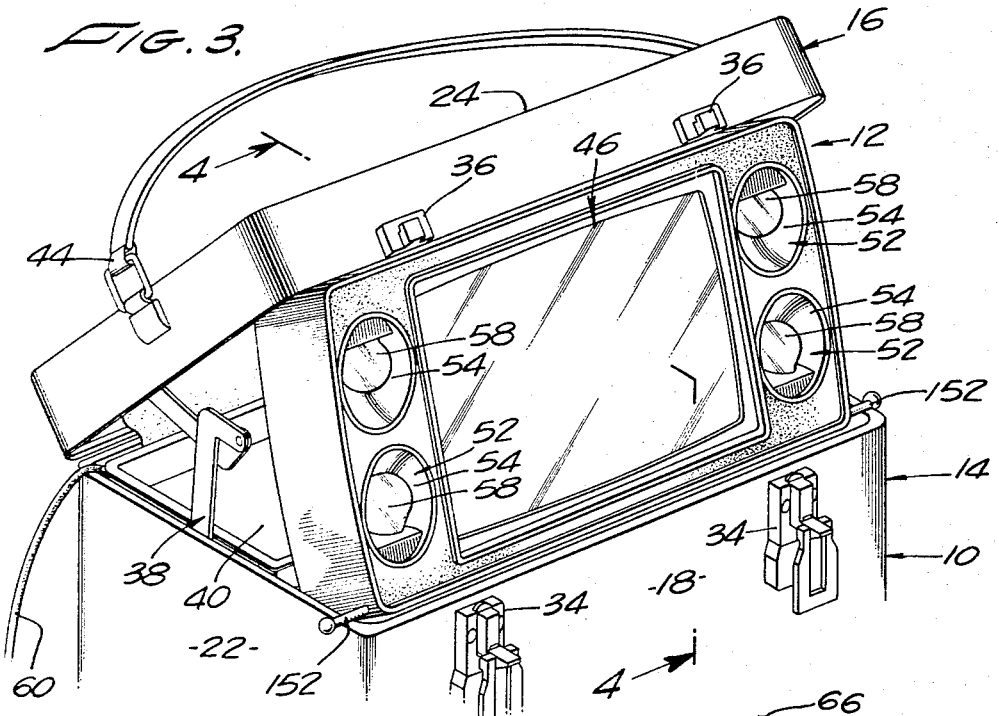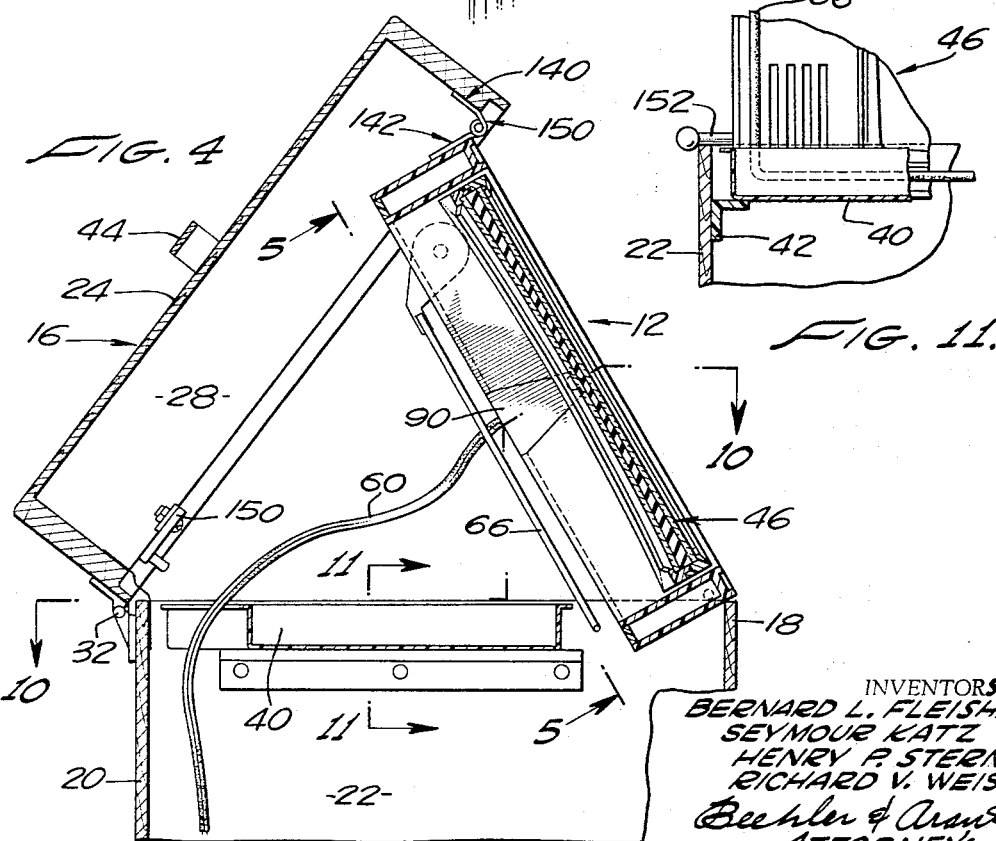

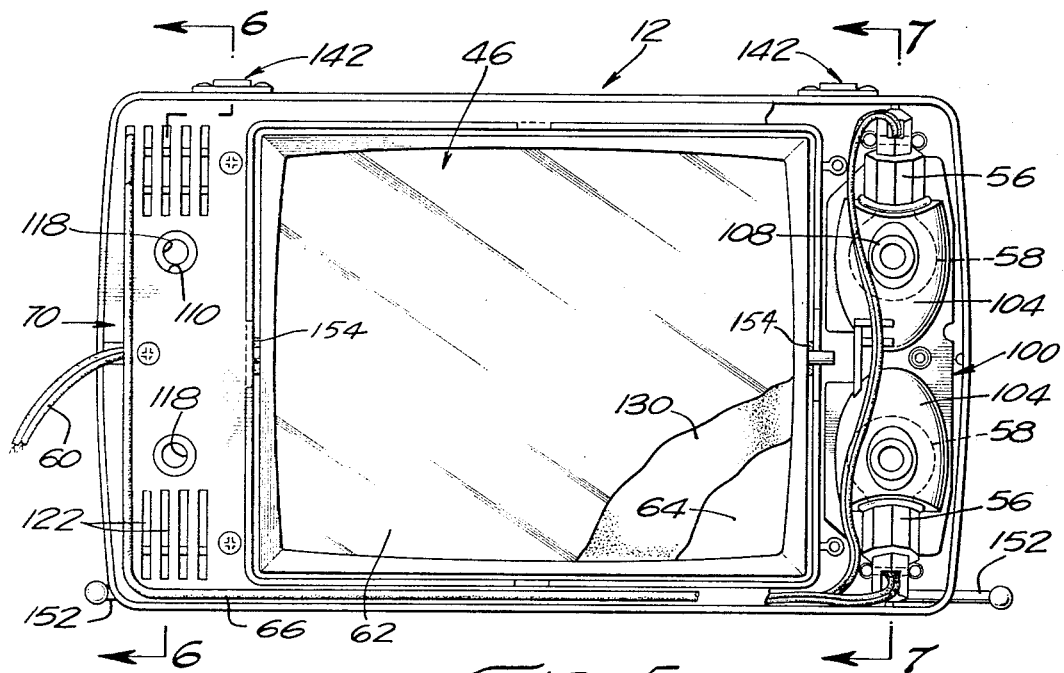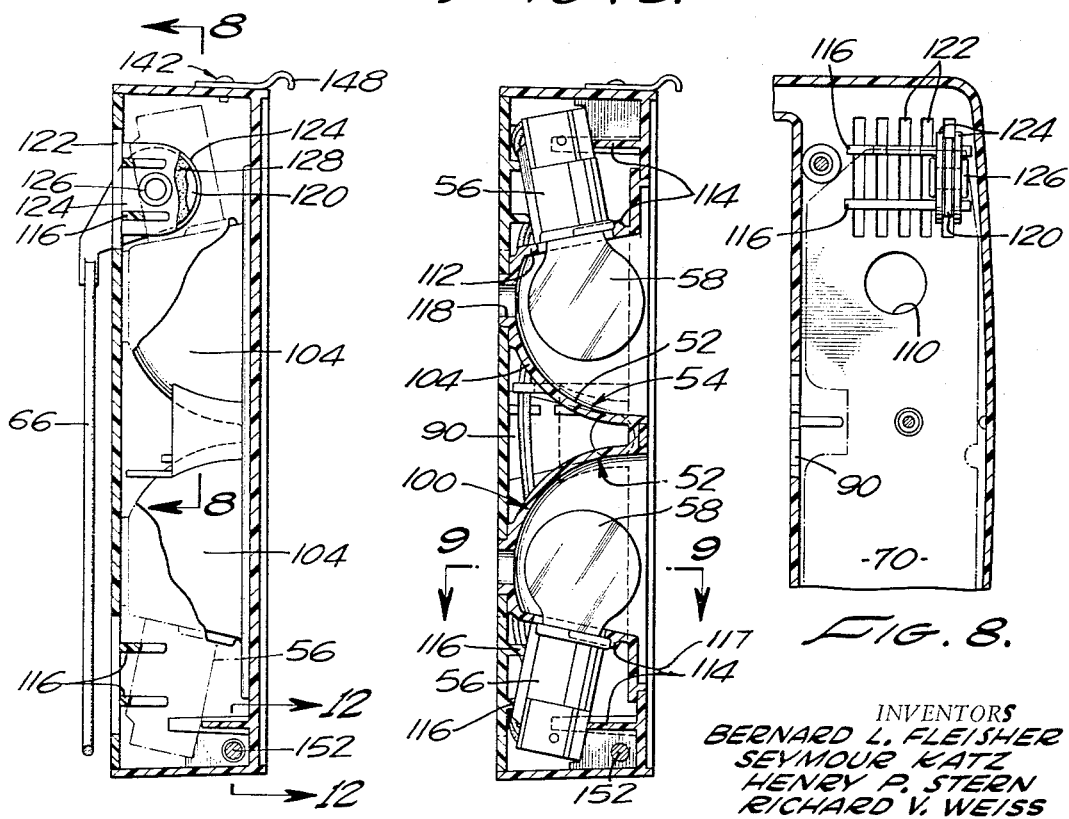

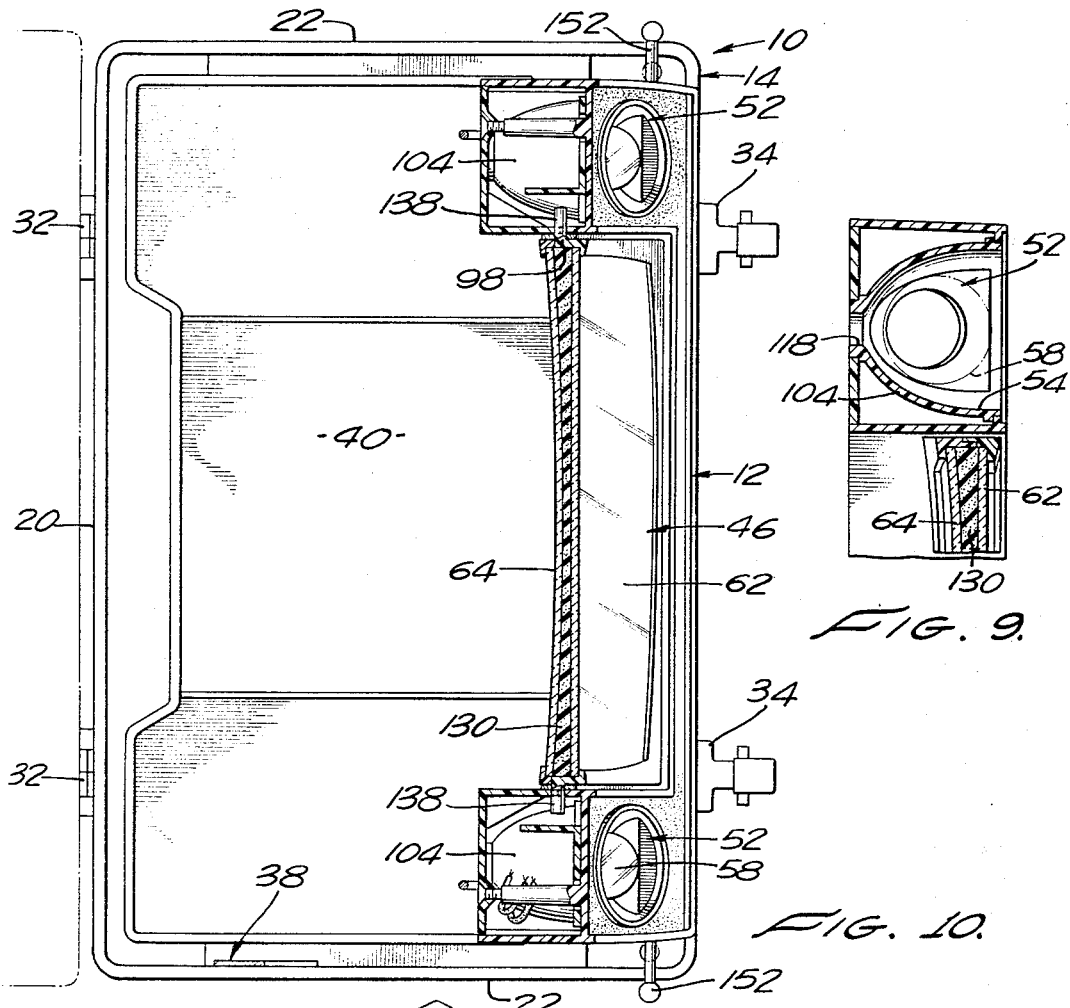
FIG. 9.
FIG. 10.
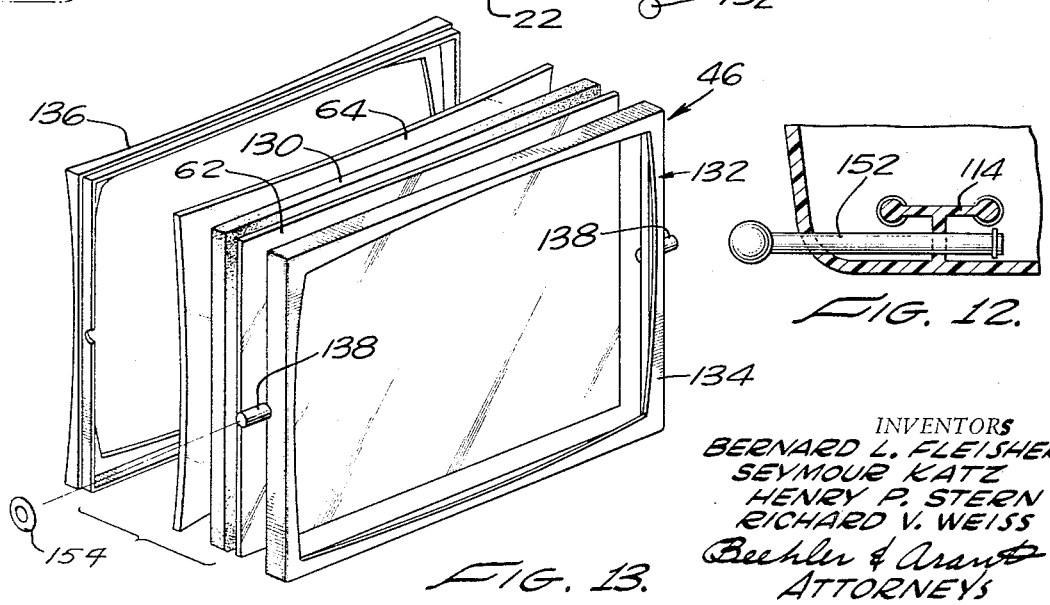
FIG. 12.
FIG. 13.
INVENTORS
BERNARD L. FLEISHER
SEYMOUR KATZ
HENRY P. STERN
RICHARD V. WEISS
Beehler & Arant
ATTORNEYS

INVENTORS
BERNARD L. FLEISHER
SEYMOUR KATZ
HENRY P. STERN
RICHARD V. WEISS

Beehler & Arant
ATTORNEYS

_United States Patent Office_

3,381,120
Patented Apr. 30, 1968

3,381,120
TRAVEL CASE WITH DETACHABLE
ILLUMINATED COSMETIC MIRROR
Bernard L. Fleisher, Beverly Hills, Seymour Katz, Los
Angeles, Henry P. Stern, Beverly Hills, and Richard V.
Weiss, Los Angeles, Calif., assignors to Bercy, Venice,
Calif., a corporation of California
Filed May 9, 1966, Ser. No. 548,619
13 Claims. (Cl. 240—4.2)

ABSTRACT OF THE DISCLOSURE

The illuminated cosmetic mirror includes a generally rectangular frame having considerable thickness and a largely hollow interior, a generally rectangular opening in the center of the frame, a mirror occupying the rectangular opening, four lamp recesses formed in the frame of which two are at one end of the frame and two are at the other end, and four lamps. Each of the four lamps occupies one of the recesses. There are separate sockets and reflectors for each of the lamps. The reflector illuminates the face of a user of the mirror while the mirror itself receives no direct illumination. The frame is formed of separate front and rear portions which are joined together so as to captivate the lamp sockets between them. The illuminated mirror can be attached to the inside lid of a travel case.

---

This invention relates generally to portable grooming aids and, more particularly, to a novel travel case and grooming mirror combination and to a novel portable grooming mirror for use by itself or in the combination.

The ever increasing popularity of local and world travel has created a demand for travel aids of all sorts which simplify the problems normally attendant to such tourist activity. There is a particularly great demand for women's grooming aids, such as grooming or make-up mirrors, which may be conveniently transported from one location to another and used with minimum effort and maximum effectiveness.

It is a general object of the present invention to provide such a portable grooming aid.

A more specific object of the invention is to provide a novel travel case and grooming mirror combination wherein the mirror is mounted in the case for movement between an extended position of use adjacent the front of the case in which the mirror is ideally situated for grooming purposes and a retracted position of storage within the lid of the case in which the mirror is disposed to permit closing of the lid without interference between the mirror and articles in the case.

Another object of the invention is to provide a travel case and grooming mirror combination wherein the mirror is detachable for use separately from the case.

Yet another object of the invention is to provide a travel case and grooming mirror combination wherein the mirror does not interfere with convenient access to articles within the case.

A further object of the invention is to provide a travel case and grooming mirror combination, and a grooming mirror for use by itself or in the combination, which mirror is equipped with a novel lamp arrangement for illuminating the face of the user.

A related object of the invention is to provide a travel case and grooming mirror combination and a grooming mirror according to the foregoing object wherein the lamps are recessed into the mirror frame in such a way as to be shielded against breakage.

Yet a further object of the invention is to provide a travel case and grooming mirror combination and a grooming mirror of the character described, which mirror embodies a mirror unit or reflector that is pivotally mounted for rotation to any desired viewing attitude.

A related object of the invention is to provide a travel case and grooming mirror combination and a grooming mirror according to the foregoing object wherein the pivotally mounted mirror unit or reflector comprises a plane mirror surface and a concave magnifying mirror surface which may be selectively rotated into viewing position.

Other objects of the invention are concerned with providing a travel case and grooming mirror combination and a grooming mirror of the character described which are relatively simple in construction, economical to manufacture, pleasing in appearance, easy to use, rugged, and otherwise ideally suited to their intended purposes.

Still other objects, advantages, and features of the invention will become readily evident as the description proceeds.

With these and such other objects in view, the invention consists in the construction, arrangement, and combination of the various parts of the invention, whereby the objects contemplated are attained, as hereinafter set forth, pointed out in the appended claims, and illustrated in the accompanying drawings.

In these drawings:

FIGURE 3 is a perspective view of the travel case and mirror in FIGURE 1 illustrating the mirror extended to its forward position of use adjacent the front of the base of the travel case;

FIGURE 4 is a section taken on line 4—4 in FIGURE 3;

FIGURE 5 is a view of the back side of the mirror taken on line 5—5 in FIGURE 4, with a portion of the rear wall of the mirror frame broken away to expose certain lamp sockets embodied in the mirror;

FIGURE 6 is a section taken on line 6—6 in FIGURE 5;

FIGURE 7 is a section taken on line 7—7 in FIGURE 5;

FIGURE 8 is a section taken on line 8—8 in FIGURE 6;

FIGURE 9 is a section taken on line 9—9 in FIGURE 7;

FIGURE 10 is a section taken on line 10—10 in FIGURE 4;

FIGURE 11 is a section taken on line 11—11 in FIGURE 4;

FIGURE 12 is a section taken on line 12—12 in FIGURE 6;

FIGURE 13 is an exploded perspective view of a pivotally mounted reflector assembly embodied in the mirror;

Figure 1:
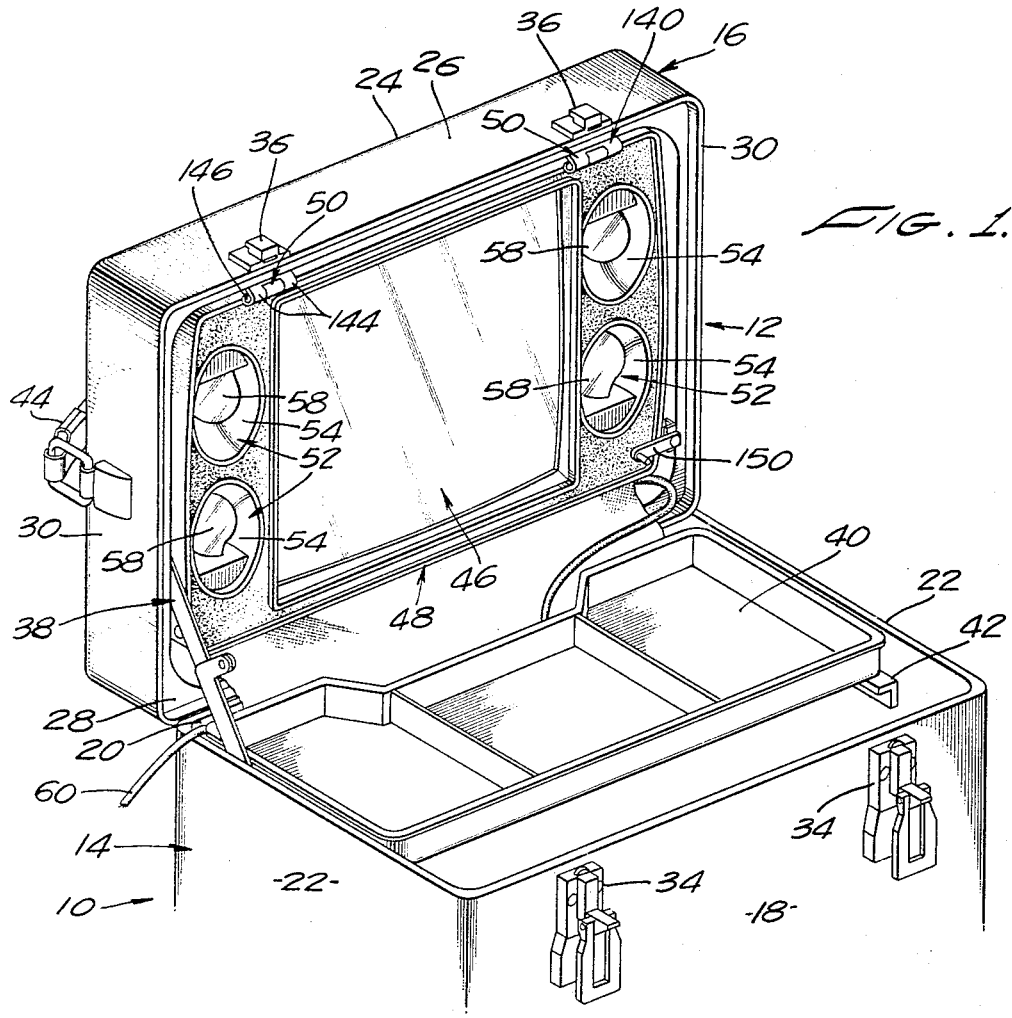
FIGURE 1 is a perspective view of a travel case and mirror combination according to the invention, illustrating the mirror in its retracted position of storage within the lid of the case.

The embodiment of the invention which has been selected for illustration in these drawings comprises a travel case 10 and a mirror 12. The travel case 10 includes a base 14 and a lid 16. Base 14 has a bottom wall (not shown) bounded by upstanding front, rear, and side walls 18, 20 and 22, respectively. Lid 16 has a top wall 24 bounded by depending front, rear, and side flanges 26, 28, and 30, respectively. The rear wall 20 of the base 14 and the rear flange 28 of the lid 16 are pivotally connected by hinges 32 which support the lid on the base for swinging movement between a closed position (not shown), wherein the lid closes the open top of the base, and an open position, shown in FIGURE 1, wherein the lid is disposed in a generally erect attitude over the rear base wall. The lid is swingable through an intermediate position, shown in FIGURES 3 and 4, between its open and closed positions, wherein the lid slopes forwardly and upwardly relative to the base. Mounted on the front wall 18 of the base 14 and the front flange 26 of the lid 16 are coacting latch means 34 and 36 for releasably locking the lid in its closed position. A hinged brace 38 is pivotally connected between the base 14 and the lid 16 to limit swinging movement of the lid to its open position of FIGURE 1.

Disposed within the open top of the base 14 is a removable tray 40. The ends of this tray rest on brackets 42 secured to the inner surfaces of the base side walls 22. When the tray 40 is positioned in the base 14, the top of the tray is substantially flush with the top of the base, as shown.

The illustrated travel case 10 is of the type which is commonly referred to as a cosmetic case and is generally used by women for carrying grooming aids, such as cosmetics, jewelry, brushes, combs, and the like. A strap handle 44 is secured to the lid 16 to facilitate carrying of the case.

The present invention is concerned primarily with the mirror 12 and its manner of attachment to the travel case 10. Considered generally, the mirror 12 comprises a central reflector assembly 46 surrounded by an open, generally rectangular frame 48. The reflector assembly 46 is pivotally mounted on the frame 48 for rotation of the assembly relative to the frame on a normally horizontal medial axis of the assembly and frame. The normally upward edge of the mirror frame 48 is pivotally connected, by hinge means 50, to the front edge or flange 26 of the travel case lid 16. Hinge means 50 support the mirror 12 on the lid 16 for swinging movement relative to the lid between a retracted position of storage, shown in FIGURE 1, wherein the mirror is located adjacent the lid to permit closing of the lid, and an extended position of use, shown in FIGURES 3 and 4, wherein the mirror is supported on the base 14 of the travel case, adjacent the front wall 18 of the base. As shown in FIGURES 3 and 4, the lid 16 occupies its intermediate position of forwardly and upwardly sloping relation to the base 14 when the mirror 12 is located in its extended position of use. It is significant to note at this point that in its extended position of use, the mirror 12 is located in close proximity to the face of the user and is, therefore, ideally situated for grooming purposes. It is further significant to note that the pivotal mounting of the reflector assembly 46 on the mirror frame 48 permits the reflector assembly to be located in any desired viewing attitude, regardless of the angle of the mirror frame 48, when the mirror is in its extended position of use. As shown in FIGURE 1, the mirror 12 is mounted in the travel case lid 16 in such a way that the mirror may also be used for viewing in its retracted position of storage when the lid occupies its full open position.

Formed in and opening through the front side of the mirror frame 48 are four lamp recesses 52. These lamp recesses are bounded, at their rear sides, by concave forwardly presented wall surfaces 54. Mounted on the mirror frame 48, within each lamp recess 52, is a lamp socket 56 containing a lamp 58. Lamps 58 are energized through an electrical lead 60 which carries a plug (not shown) for insertion into an electrical outlet receptacle. These lamps transmit light forwardly of the mirror 12 for illuminating the face of the user. Preferably, the walls 54 of the lamp recesses 52 are silvered for reflecting light from the lamps 58 forwardly to enhance illumination of the user's face.

If desired, the reflector assembly 46 of the mirror 12 may embody a single reflector, or mirror element. Preferably, however, the reflector assembly comprises a pair of reflectors, or mirror elements, 62 and 64 disposed back to back, in the manner shown best in FIGURES 10 and 13. Reflector 62 has a flat mirror surface. Reflector 64 has a concave mirror surface and produces a magnifying effect. It is obvious that either of the reflectors 62 or 64 may be rotated into viewing position by rotating the reflector assembly 46 relative to the mirror frame 48.

As will appear presently, the hinge means 50 which pivotally mount the mirror 12 in the travel case lid 16 at releasable to permit removal of the mirror from the case. The mirror may thus be used and transported independently of the case. For this reason, the mirror carries supporting means 66 for supporting the mirror in its upright position of use, illustrated in FIGURE 2, when the mirror is removed from the travel case.

Referring now in greater detail to the mirror 12, the mirror frame 48 comprises separable front and rear portions 68 and 70, respectively. These frame portions are preferably fabricated from plastic by an injection molding process. The front frame portion 68 has a generally annular rectangular front wall 72 perimetrically bounded, along its inner and outer edges, by rearwardly directed inner and outer flanges 74 and 76, respectively. In order to improve the aesthetic appearance of the mirror frame, the front wall 72 may be recessed slightly, as shown in the drawings. The inner flange 74 of the front frame portion 68 defines a central rectangular opening 78 through the latter frame portion. Extending through the vertical portions of the front wall 72, at opposite sides of this central opening, are generally elliptical holes 80 which define the front openings of the lamp recesses 52.

The rear portion 70 of the mirror frame 48 comprises an open generally flat and rectangular wall 82. This rear frame wall is shaped and dimensioned to fit within and close the rear side of the rearwardly opening, rectangular channel-like space defined between the inner and outer flanges 74, 76 of the front frame portion 68. When positioned within the rear side of the front frame portion 68, the rear wall 82 seats against the rear ends of a number of mounting posts 84 integrally formed on the front frame portion. These posts are drilled and tapped to receive mounting screws 86 which extend through openings in the rear wall 82 for securing the latter wall to the front frame portion 68.

Integrally formed on the rear mirror frame wall 82, along the vertical sides of the rectangular opening 88 through the wall, are a pair of tapered, forwardly extending rib-like formations 90 which fit within correspondingly shaped, rearwardly opening notches 92 in the inner flange 74 of the front frame portion 78. The front ends of the rear wall formations 90 and the front edges of the front flange notches 92 have confronting semi-circular recesses 94 and 96, respectively, which define generally circular journal bores 98 when the front and rear portions 68, 70 of the mirror frame 48 are assembled.

In addition to the front and rear portions 68, 70, the mirror frame 48 comprises a pair of inserts 100, each defining a pair of lamp recesses 52. Each insert 100 has a generally flat wall portion 102 and lamp housings 104 which are integrally formed with and project rearwardly from the upper and lower ends of the respective wall 102. These lamp housings define the corresponding lamp recesses 52. The inner surfaces of the lamp housings define the concave wall surfaces 54 of the respective lamp recesses. Projecting forwardly from the front side of each flat insert wall 102, in surrounding relation to the corresponding lamp recesses 52, are annular lips 106. Projecting rearwardly from the rear ends of the lamp housings 104 of each mirror frame insert 102 are generally cylindrical bosses 108.

When the mirror frame 48 is assembled, the flat walls 102 of the frame inserts 100 seat against the rear surface of the front wall 72 of the front frame portion 68, about the elliptical openings 80 in the latter wall, and the lips 106 on the insert project through these openings, as shown best in FIGURE 7. It will be observed that the insert lips 106 are shaped and dimensioned to fit closely within their respective openings 80. The rearwardly projecting bosses 108 on the lamp housings 104 of the frame inserts 100 project through circular openings 110 in the rear frame wall 82, also as shown best in FIGURE 7. The lamp housing bosses 108 are dimensioned to fit closely within the rear wall openings 110. It is evident at this point that the interfitting engagement of the front lips 106 and rear bosses 108 on the frame inserts 100 within the openings 80 and 110 in the front and rear frame portions 68 and 70 serve to retain the inserts in fixed position within the mirror frame 48. If desired, however, the inserts 100 may be cemented or otherwise secured to the front frame portion 68.

As may be best observed in FIGURE 7, the wall of each frame insert lamp housing 104 has an opening 112 to the interior of the mirror frame 48. Each lamp socket 56 is disposed with its base located within the interior of the mirror frame and its mouth located adjacent and aligned with the wall opening 112 of the corresponding lamp housing 104 to receive the base of its respective lamp 58. Integrally formed on the front and rear portions 68, 70 of the mirror frame 48 and on the frame inserts 100 are formations 114, 116, and 117, respectively, which are shaped to straddle and clamp therebetween the lamp sockets 56, thus to secure these sockets in fixed position within the mirror frame. As may be best observed in FIGURE 7 the lower lamp sockets 56 are located below their respective lower lamp housings 104 and the upper lamp sockets 56 are located above their respective lamp housings 104 whereby the illustrated lamp orientation is achieved, which results in optimum illumination of the user's face, with minimum overall fore and aft width or thickness of the mirror frame 48

Preferably the front sides of the lamp recesses 52 are left open as shown to permit escape of the heat generated by the lamps If desired additional ventilation of the lamps may be obtained by forming ventilation openings 118 in the rear bosses 108 of housings 104. It is significant to note at this point that the lamps 58 are substantially flush with, or are even inset slightly behind the front side of the mirror frame 48, whereby the lamps are shielded against breakage.

In operation, the illuminated mirror of the present invention is most advantageously used for viewing the face of a person, particularly for cosmetic purposes. It is significant that the lamps 58, in conjunction with their respective lamp reflectors 54, provide direct illumination on the face of the user but do not directly illuminate the mirror. The level of illumination upon the face of the user may not be very high, but since the surface of the mirror is relatively dark the face of the user seems brightly lighted by comparison, and a clear and detailed view of the face is therefore obtained. It is also, significant that the four lamps and their respective reflectors provide four separate sources of illumination, the light from each lamp being concentrated in a relatively small area by virtue of its associated reflector, but a substantial overlapping of the four sources of illumination being nevertheless achieved at a point removed some substantial distance from the mirror, where the face of the user is normally located. The vertical and horizontal separation of the lamps from each other is also significant. Each of the four lamps directly illuminates one quadrant of the user's face, and also illuminates the other three quadrants but less directly and at different angles. Complete illumination of all surface irregularities, including creases, is therefore achieved, so that complete self-viewing of the face is easily and conveniently attained.

Figure 2:
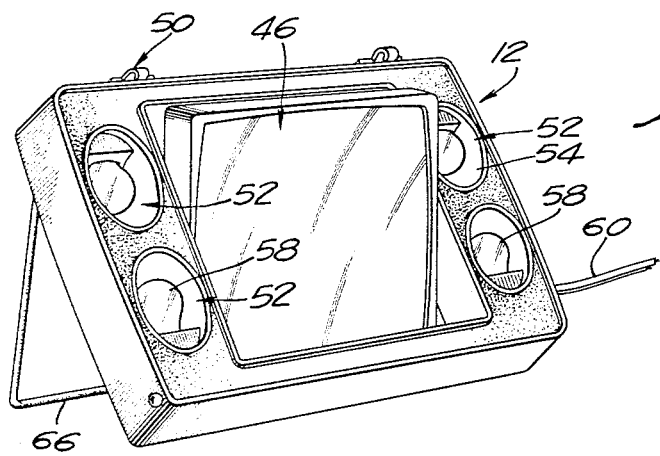
FIGURE 2 is a perspective view of the mirror removed from the case and disposed in its normal upright position of use.
Figure 14:
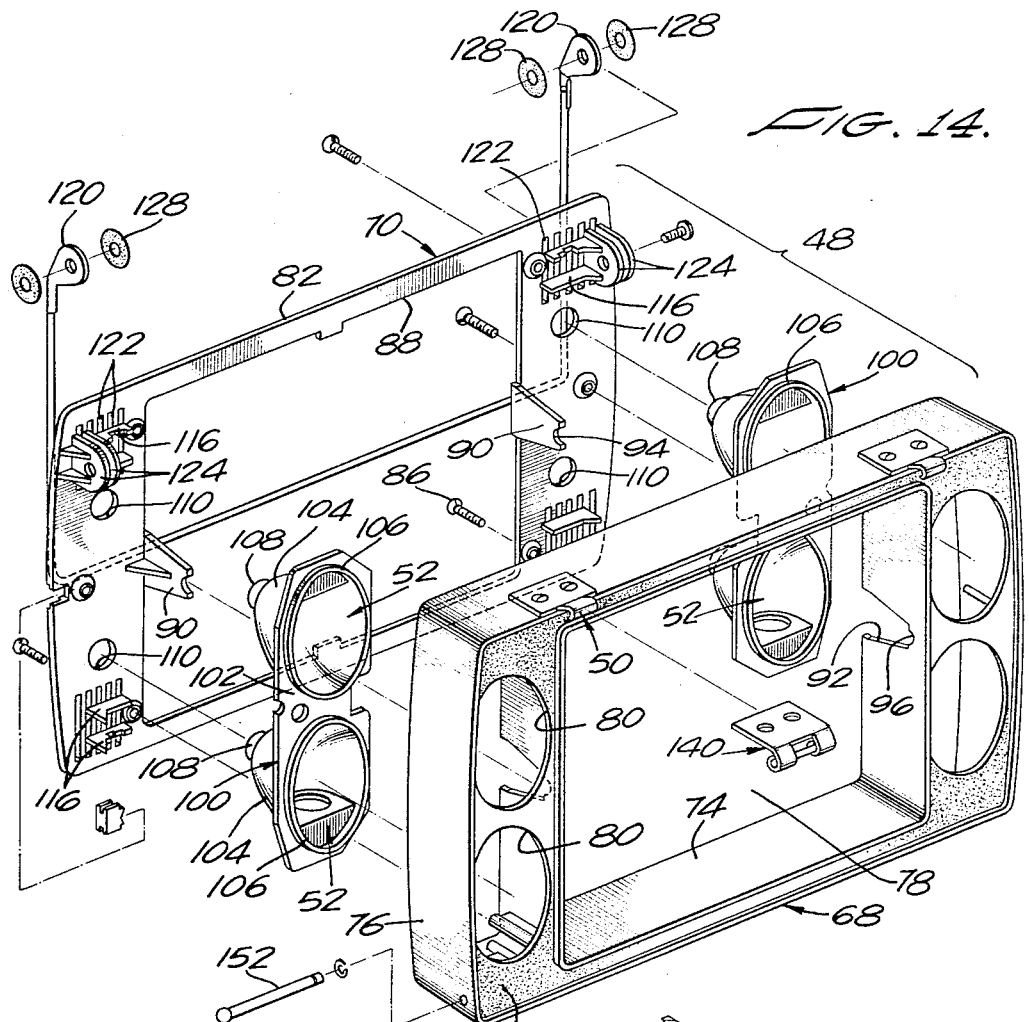
FIGURE 14 is an exploded perspective view of the mirror frame.
Figure 15:
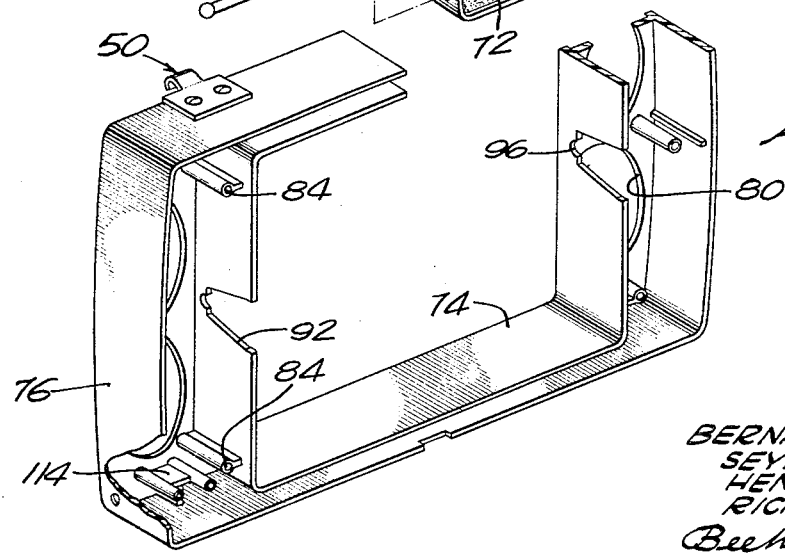
FIGURE 15 is a fragmentary perspective view of the rear side of the front portion of the mirror frame.

The supporting means 66 for supporting the mirror 12 in its upright position of use, illustrated in FIGURE 2, when the mirror is removed from the travel case 10, comprises a generally U-shaped wire brace or stand. Fixed to the upper ends of this wire stand are a pair of flat, generally disc-shaped hings members 120 which extend through vertical slots 122 in the upper portion of the rear mirror frame wall 82. Integrally formed on the front side of this wall, at opposite sides of the wall slots 122, are hinge brackets 124 which straddle the hinge members 120 of the mirror stand 66. The mating hinge members and brackets are pivotally joined by rivets 126. Positioned between the hinge members 120 and their adjacent hinge brackets 124 are friction washers 128. The hinge rivet 126 retain the confronting faces of the hinge members and brackets in pressured contact with these washers, whereby the latter serve to frictionally retain the mirror stand 66 in its extended, mirror supporting position of FIGURE 2. When the mirror 12 is installed in the travel case 10, the mirror stand 66 is swung forwardly to its retracted position of FIGURE 6, against the rear side of the mirror frame 48.

As noted earlier, the central reflector assembly 46 of the mirror 12 comprises a pair of reflectors or mirror elements 62, 64 which are disposed back to back, as shown best in FIGURES 10 and 13. These reflectors are rectangular in shape and are separated by an intervening resilient pad 130 of foam rubber, or the like. This pad serves the multiple function of separating the reflectors, cushioning the reflectors, and accommodating the convex curvature of the back side of the magnifying reflector 64. The reflectors 62, 64 and the intervening resilient pad 130 are surrounded and supported by an open rectangular inner frame 132 of the mirror 12. This inner frame comprises separately formed portions 134, 136 having interfitting flanges, as shown. Frame portions 134, 136 are joined by an convenient way, as by cementing the frame portions to one another, thus to confine therebetween the reflectors and the intervening pad. Projecting from the normally vertical sides of the frame portion 134, on a common medial axis of the frame 132, are journals 138. These frame journals fit rotatably within the journal bores 98, referred to earlier, in the outer or main mirror fame 48 and serve to support the reflector assembly 46 for rotation relative to the mirror frame 48, in the manner explained earlier.

The illustrated hinge means 50 for pivotally securing the mirror 12 to the lid 16 of the travel case 10 comprise hinge parts 140 on the lid and coacting hinge parts 142 on the mirror frame 48. The lid mounted hinge parts 140 are attached to the front flange 26 of the lid, adjacent its normally lower edge, and each has a pair of spaced arms 144 supporting a hinge pin 146. The mirror mounted hinge parts 142 are attached to the normally upper edge of the mirror frame 48 and comprise upwardly arching, downwardly opening hook formations 148 which project beyond the front side of the mirror, as shown best in FIGURE 6. The coacting parts 140, 142 of the respective hinge means 50 are engaged by inclining the mirror at a relatively large acute angle relative to the lid 16 and then inserting the hook formations 148 of the mirror hinge parts 142 into the spaces between the arms 144 of the lid hinge parts 140 in such a way that the hook formations pivotally engage the hinge pins 146 of the latter parts in the manner illustrated best in FIGURES 1 and 4. Subsequent downward rotation of the mirror toward the lid effectively locks the coacting hinge parts against separation. The hinge means 50 will be recognized, from the above description, to be conventional. Accordingly, no further discussion of these hinges is deemed necessary.

As noted earlier, the mirror 12 is swingable or rotatable relative to the lid 16, when the lid is open, between a retracted position of storage, illustrated in FIGURE 1, and an extended position of use, illustrated in FIGURES 3 and 4. In its retracted position of storage, the mirror 12 fits within the normally downwardly opening space in the lid 16, defined by the lid flanges 26, 28, and 30. The mirror may be retained in this retracted position in any convenient way, as by means of a pivotal latch 150 on the lid. As explained earlier, and illustrated in FIGURES 3 and 4, when the mirror 12 occupies its extended position of use, the mirror is supported on the base 14 of the travel case 10, adjacent the front wall 18 of the base. To this end, the mirror is provided with supporting means 152 for resting on the base. The supporting means 152 may assume various forms. In the drawings, for example, the mirror supporting means 152 comprise pins which are slidably mounted in the vertical side portions of the mirror frame 48, adjacent the bottom edge of the frame, for movement between extended positions, illustrated in FIGURES 3, 4 and 11, wherein the pins are disposed for supporting engagement with the side walls 22 of the travel case base 14, and the retracted positions illustrated in FIGURE 5, wherein the pins are disposed to clear the side flanges 30 of the travel case lid 16, thus to permit retraction of the mirror 12 into the lid. It is signifiical to note that when the mirror 12 is supported in its extended position of use, the bottom edge of the mirror frame 48 projects a small distance into the open top of the travel case base 14, as shown best in FIGURES 3 and 4. The bottom edge of the mirror frame is thus disposed for abutting engagement with the front wall 18 of the base, thus to prevent the bottom edge of the mirror from dropping over the front side of the base.

As noted earlier, the mirror 12, when in its retracted position of storage illustrated in FIGURE 1, is substantially flush with the underside of the lid 16, thus permitting the lid to be closed. The mirror, when extended to its forward position of use illustrated in FIGURES 3 and 4, is located at the front of the base 14, in close proximity to the face of the user and, therefore, is ideally situated in optimum grooming position. The central reflector assembly 46 of the mirror may be rotated relative to the outer mirror frame 48 to locate either reflector 62 or 64 of assembly in any desired viewing attitude. Friction washers 154 may be mounted on the journals 138 of the reflector assembly, between the frame 132 of this assembly and the inner flange 74 of the outer mirror frame 48, for frictionally retaining the reflector assembly in the desired viewing attitude. The mirror lamps 58 provide optimum illumination of the user's face in all of these different viewing attitudes of the reflectors. If desired, the mirror 12 may be used for viewing when retracted to its position of storage within the lid 16, by rotating the lid to its erect, full open position of FIGURE 1. The mirror 12 may be removed from the travel case 10, to permit separate use of the mirror, as illustrated in FIGURE 2, by rotating the mirror upwardly relative to the lid 16 to a position wherein the coacting parts 140, 142 of the hinges 50 may be separated. It is obvious at this point, therefore, that the mirror may be sold as a separate unit for use independently of the travel case.

Clearly, therefore, the invention herein described and illustrated is fully capable of attaining the several objects and advantages preliminarily set forth.

While the presently preferred embodiment of the invention has been described and illustrated for illustrative purposes, various modifications in the design, arrangement of parts, and instrumentalities of the invention are possible within the spirit and scope of the following claims.

What is claimed as new in support of Letters Patent is:
1. In combination:
a travel case including a base having a bottom wall bounded by upstanding front, rear and side walls, and a lid hinged to said rear wall for swinging between open and closed positions relative to said base, said lid having a top wall bounded by depending front, rear, and side flanges defining a space in an opening through the normally undersides of said lid,
a mirror including a frame having a central opening therethrough, a reflector disposed within said frame opening, means pivotally mounting said reflector on said frame for rotation of said reflector relative to said frame on a normally horizontal medial axis of said reflector and frame, thus to permit said reflector to be located in any desired viewing attitude relative to said frame, said frame having a number of lamp recesses opening through its front side, and lamps mounted within said recesses, respectively, substantially flush with the front side of said frame, whereby said lamps are shielded against breakage,
releasable hinge means pivotally connecting the normally upper edge of said mirror frame to said front lid flange for fore and aft swinging movement of said mirror relative to said lid, when said lid is open, between a rear retracted position of storage, wherein said mirror is located within said lid space substantially flush with the underside of said lid, and a forward extended position of use, wherein the bottom edge of said mirror frame projects into the open top of said base adjacent the front wall thereof,
supporting members mounted on said frame along the normally vertical sides thereof for extension beyond said frame sides to positions wherein said members are disposed for vertical supporting engagement with the upper edges of said base side walls and retraction into said frame to positions wherein said members are disposed to clear said lid side flanges, thus to permit retraction of said mirror into said lid space,
means for releasably latching said mirror in said retracted position of storage within said lid space, and
said hinge means being releasable to permit removal of said mirror from said case.

2. In combination:
a travel case including a base having a bottom wall bounded by upstanding front, rear, and side walls, and a lid hinged to said rear wall for swinging between open and closed positions relative to said base;
a mirror;
hinge means pivotally mounting said mirror on the normally underside of said lid for swinging movement relative to said lid, when said lid is open, between a rear retracted position of storage, wherein said mirror is disposed adjacent said lid to permit closing of said lid, and a forward extended position of use, wherein said mirror is supported in a generally upright position on said base adjacent the front wall thereof;
said lid having a front edge which is uppermost when said lid is open and said mirror having a normally upper edge located adjacent said front edge of said lid and an opposite normally lower edge;
said hinge means being attached to said lid adjacent said front edge and to said mirror adjacent said upper edge, whereby the bottom of said mirror is swingable toward and away from said lid to locate said mirror in said retracted position of storage and said extended position of use;
supporting means on said mirror adjacent said bottom edge thereof adapted to rest on said base adjacent said front base wall for supporting said mirror in said extended position of use;
said supporting means comprising supporting members mounted on said mirror for movement relative to said mirror between extended positions wherein said members are disposed for supporting engagement with said base side walls and retracted positions wherein said members are disposed to permit retraction of said mirror to said position of storage;
said mirror including a reflector and a frame surrounding said reflector;
said supporting members comprising pins mounted on said frame along the normally vertical sides thereof for outward extension beyond said frame sides to positions wherein said pins are disposed for supporting engagement with the upper edges of said base side walls and inward retraction into said frame to positions wherein said pins are disposed to permit retraction of said mirror to said position of storage; and said pins being located a distance above the bottom edge of said mirror frame, whereby when said mirror occupies said extended position of use, said bottom frame edge projects downwardly into said base for engagement with said front base wall to retain said mirror in said extended position of use.

3. In combination:

a travel case including a base having a bottom wall bounded by upstanding front, rear, and side walls, and a lid hinged to said rear wall for swinging between open and closed positions relative to said base;

a mirror;

hinge means pivotally mounting said mirror on the normally underside of said lid for swinging movement relative to said lid, when said lid is open, between a rear retracted position of storage, wherein said mirror is disposed adjacent said lid to permit closing of said lid, and a forward extended position of use, wherein said mirror is supported in a generally upright position on said base adjacent the front wall thereof;

said mirror including a reflector, a frame surrounding said reflector, and means pivotally mounting said reflector on said frame for rotation of said reflector relative to said frame on a normally horizontal medial axis of said reflector and frame;

said lid having a front edge which is uppermost when said lid is open and said mirror frame having a normally upper edge adjacent said front edge of said lid and an opposite normally lower edge;

said hinge means being attached to said lid adjacent said front edge and to said mirror frame adjacent said upper edge, whereby the bottom edge of said mirror frame is swingable toward and away from said lid to locate said mirror in said extended position of use and said retracted position of storage;

said lid being disposed in a generally erect attitude over said rear base wall when said lid occupies its full open position and said lid being swingable to an intermediate position between said full open position and said closed position wherein said lid slopes forwardly and upwardly relative to said base;

said reflector being generally parallel to said lid when said mirror occupies said retracted position of storage, whereby said mirror may be used for viewing when in said retracted position of storage with said lid in said full open position;

said lid occupying said intermediate position and said mirror frame inclining forwardly relative to said lid when said mirror occupies said extended position of use;

said reflector being rotatable relative to said mirror frame to locate said reflector in any desired viewing attitude when said mirror occupies said extended position of use.

4. In combination:

a travel case including a base having a bottom wall bounded by upstanding front, rear, and side walls, and a lid hinged to said rear wall for swinging between open and closed positions relative to said base;

a mirror;

hinge means pivotally mounting said mirror on the normally underside of said lid for swinging movement relative to said lid, when said lid is open, between a rear retracted position of storage, wherein said mirror is disposed adjacent said lid to permit closing of said lid, and a forward extended position of use, wherein said mirror is supported in a generally upright position on said base adjacent the front wall thereof;

said mirror comprising a reflector, a hollow frame surrounding said reflector including separately formed and releasably joined front and rear frame portions, said front frame portion having forwardly opening lamp recesses bounded by rear concave forwardly presented wall surfaces, lamp sockets mounted on said frame adjacent said lamp recesses, respectively, with the base of each socket located within said frame and the mouth of each socket opening to the respective lamp recess, and a lamp within each lamp recess mounted in the adjacent lamp socket;

said front and rear frame portions including confronting formations which straddle and clamp therebetween said lamp sockets, thus to secure said lamp sockets in fixed position within said frame.

5. In combination:

a travel case including a base having a bottom wall bounded by upstanding front, rear, and side walls, and a lid hinged to said rear wall for swinging between open and closed positions relative to said base;

a mirror;

hinge means pivotally mounting said mirror on the normally underside of said lid for swinging movement relative to said lid, when said lid is open, between a rear retracted position of storage, wherein said mirror is disposed adjacent said lid to permit closing of said lid, and a forward extended position of use, wherein said mirror is supported in a generally upright position on said base adjacent the front wall thereof;

said mirror including an outer frame having a central opening therethrough, a reflector assembly disposed within said frame opening, said frame including separately formed and releasably joined front and rear frame portions having confronting generally semicircular recesses at opposite sides of said frame opening defining journal bores at opposite sides of said frame opening disposed on a common normally horizontal generally medial axis of said frame, and journals on said reflector assembly engaging in said journal bores to rotatably support said reflector assembly on said frame for rotation to any desired viewing attitude.

6. In combination:

a travel case including a base having a bottom wall bounded by upstanding front, rear, and side walls, and a lid hinged to said rear wall for swinging between open and closed positions relative to said base;

a mirror;

hinge means pivotally mounting said mirror on the normally underside of said lid for swinging movement relative to said lid, when said lid is open, between a rear retracted position of storage, wherein said mirror is disposed adjacent said lid to permit closing of said lid, and a forward extended position of use, wherein said mirror is supported in a generally upright position on said base adjacent the front wall thereof;

said mirror including an outer frame having a central opening therethrough, a reflector assembly disposed within said frame opening, means rotatably supporting said reflector assembly on said frame for rotation of said assembly relatively to said frame about a normally horizontal medial axis of said assembly and frame, thus to permit rotation of said assembly to any desired viewing attitude; and said reflector assembly comprising a generally planar reflector and a concave magnifying reflector disposed back to back, a resilient pad positioned between said reflectors, and a frame surrounding and supporting said reflectors and pad.

7. An illuminated cosmetic mirror comprising, in combination:
a mirror;
a frame surrounding and attached to said mirror, said frame being of a generally rectangular configuration and having a generally hollow interior, and being adapted to support said mirror in a selected position of adjustment in a substantially vertical plane;
said frame having a protruding end on the left hand side of said mirror and a protruding end on the right hand side of said mirror, each of said protruding ends of said frame having formed therein both an upper lamp recess and a lower lamp recess;
four separate lamp reflectors, one being disposed in each of said lamp recesses;
four separate lamps, one being disposed in each of said lamp recesses;
a separate lamp socket incorporated into one end of each of said lamp recesses receiving a corresponding one of said lamps;
and electrical circuit means for energizing all of said lamps concurrently;
the locations of said lamp recesses and the configurations of said lamps and lamp reflectors being such that the face of a person looking into said mirror receives overlapping illumination from four separate sources while the mirror itself is not directly illuminated;
said frame including separately formed front and rear portions and means releasably joining said front and rear portions together so as to captivate said lamp sockets therebetween.

8. The device claimed in claim 7 wherein each of said lamps is an incandescent bulb, each of said lamp recesses is elongated in a vertical direction and the longitudinal axes of said bulbs are aligned parallel to each other in the normally vertical direction when said mirror is being used.

9. The device claimed in claim 8 wherein said recesses are of sufficient depth so that the entirety of said bulbs is contained therein.

10. A mirror comprising:
a frame having a central opening therethrough;
a reflector assembly disposed within said frame opening;
means pivotally mounting said reflector assembly on said frame for rotation of said assembly relative to said frame on a normally horizontal medial axis of said assembly and frame, thus to permit rotation of said reflector assembly to any desired viewing attitude;
said frame having a number of lamp recesses opening through its front side;
lamps mounted within said recesses, respectively, substantially flush with the front side of said frame, whereby said lamps are shielded against breakage;
said lamp recesses being bounded at their rear sides by convex forwardly presented reflective surfaces for reflecting light forwardly from said lamps;
said frame comprising separately formed front and rear portions, and means releasably joining said frame portions;
lamp sockets within said frame adjacent said lamp recesses, respectively, and mounting said lamps; and
said frame portions having confronting formations which straddle and clamp therebetween said lamp sockets, thus to secure said lamp sockets in fixed position within said frame.

11. A mirror comprising:
a frame having a central opening therethrough;
a reflector assembly disposed within said frame opening;
means pivotally mounting said reflector assembly on said frame for rotation of said assembly relative to said frame on a normally horizontal medial axis of said assembly and frame, thus to permit rotation of said reflector assembly to any desired viewing attitude;
said frame having a number of lamp recesses opening through its front side;
lamps mounted within said recesses, respectively, substantially flush with the front side of said frame, whereby said lamps are shielded against breakage;
said lamp recesses being bounded at their rear sides by convex forwardly presented reflective surfaces for reflecting light forwardly from said lamps;
said mirror frame comprising separately formed front and rear portions, and means releasably joining said frame portions;
said frame portions having confronting semi-circular recesses at opposite sides of frame opening defining co-axial journal bores on said axis on opposite sides of said frame opening; and
said reflector assembly comprising journals rotatably fitted in said journal bores, respectively.

12. An illuminated cosmetic mirror comprising, in combination;
a generally rectangular frame having substantial thickness and a hollow interior, and having a generally rectangular central recess on one side thereof, constituting the front side;
a reflector assembly disposed within said central recess;
a U-shaped stand pivotally attached to the rear side of said frame, for supporting said frame at a selected angle of vertical adjustment, said frame when thus supported by said stand having its longer axis horizontally disposed;
a set of four lamp recesses opening through the front side of said frame, two on each side of said central recess;
a set of four lamps mounted within respective ones of said recesses, the longitudinal axes of said lamps extending perpendicular to the longer axis of said frame and hence being vertical when the mirror is in use, said lamps being substantially flush with the front side of said frame whereby they are shielded against breakage, and operating when energized to directly illuminate the face of the user of the mirror but without directly illuminating the reflector assembly;
reflector members disposed in the bottoms of said lamp recesses and having convex forwardly presented reflective surfaces for reflecting light from the lamps to the face of the user;
said frame comprising separately formed front and rear portions, and means releasably joining said frame portions;
four lamp sockets disposed within said frame adjacent respective ones of said recesses, and receiving respective ones of said lamps; and
said frame portions having confronting formations which straddle and clamp therebetween said lamp sockets, thus to secure said lamp sockets in fixed position within said frame.

13. An illuminated cosmetic mirror comprising, in combination:
a generally rectangular frame having substantial thickness and a hollow interior, and having a generally rectangular central opening therethrough;
a reflector assembly disposed within said central opening;
means pivotally mounting said reflector assembly on said frame for rotation of said assembly relative to said frame on a normally horizontal medial axis of said assembly and frame, thus to permit rotation of said reflector assembly to any desired viewing attitude;
a set of four lamp recesses opening through the front side of said frame, two on each side of said central opening;

a set of four lamps mounted within respective ones of said recesses, the longitudinal axes of said lamps being vertical when the mirror is in use, said lamps being substantially flush with the front side of said frame whereby they are shielded against breakage, and operating when energized to directly illuminate the face of the user of the mirror but without directly illuminating the reflector assembly;

reflector members disposed in the bottoms of said lamp recesses and having convex forwardly presented reflective surfaces for reflecting light from the lamps to the face of the user;

four lamp sockets disposed within said frame adjacent respective ones of said recesses, and receiving respective ones of said lamps; and said frame comprising separately formed front and rear portions, and means releasably joining said frame portions together for captivating said sockets therebetween.

References Cited

UNITED STATES PATENTS

| | | | |
|---|---|---|---|
| 1,499,361 | 11/1923 | Freund | 190—42 |
| 3,177,991 | 12/1962 | Walker | 190—42 |
| 3,217,154 | 3/1962 | Owen | 240—4.2 |
| 3,268,715 | 8/1965 | Rothman | 240—4.2 |

FOREIGN PATENTS 565,760    11/1944    Great Britain.

NORTON ANSHER, *Primary Examiner.*

G. M. HOFFMAN, *Assistant Examiner.*